ated under 35

(12) United States Patent
Smithson

(10) Patent No.: US 10,767,069 B2
(45) Date of Patent: Sep. 8, 2020

(54) AQUEOUS CARBON NANOPARTICLE INK COMPOSITION FOR RESISTORS

(71) Applicant: XEROX CORPORATION, Norwalk, CT (US)

(72) Inventor: Chad S. Smithson, Toronto (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/968,324

(22) Filed: May 1, 2018

(65) Prior Publication Data

US 2019/0338154 A1    Nov. 7, 2019

(51) Int. Cl.

| | | |
|---|---|---|
| C09D 11/52 | (2014.01) | |
| C09D 11/033 | (2014.01) | |
| C09D 11/037 | (2014.01) | |
| C09D 11/08 | (2006.01) | |
| C09D 11/322 | (2014.01) | |
| H01C 7/00 | (2006.01) | |
| H01C 17/065 | (2006.01) | |
| C08K 3/04 | (2006.01) | |
| B41M 5/00 | (2006.01) | |
| B41M 7/00 | (2006.01) | |
| B82Y 30/00 | (2011.01) | |
| B82Y 40/00 | (2011.01) | |

(52) U.S. Cl.
CPC .......... C09D 11/52 (2013.01); B41M 5/0023 (2013.01); B41M 7/009 (2013.01); C09D 11/033 (2013.01); C09D 11/037 (2013.01); C09D 11/08 (2013.01); C09D 11/322 (2013.01); H01C 7/003 (2013.01); H01C 17/06506 (2013.01); B82Y 30/00 (2013.01); B82Y 40/00 (2013.01); C08K 3/041 (2017.05); *Y10S 977/752* (2013.01); *Y10S 977/842* (2013.01); *Y10S 977/932* (2013.01)

(58) Field of Classification Search
CPC .............................. C09D 11/38; C09D 11/322
See application file for complete search history.

(56) References Cited

U.S. PATENT DOCUMENTS

| | | | | |
|---|---|---|---|---|
| 6,602,994 | B1 * | 8/2003 | Cash ....................... | A61K 8/027 |
| | | | | 536/30 |
| 2007/0292622 | A1 * | 12/2007 | Rowley ................... | B82Y 10/00 |
| | | | | 427/407.1 |
| 2014/0267515 | A1 * | 9/2014 | Zhang .................... | C09D 11/30 |
| | | | | 347/100 |
| 2015/0162555 | A1 | 6/2015 | Wu et al. | |
| 2017/0298346 | A9 | 10/2017 | Liu et al. | |
| 2018/0305569 | A1 * | 10/2018 | Gatenholm ........ | A61N 1/36067 |
| 2019/0002700 | A1 * | 1/2019 | Andrews ............. | C09D 11/037 |

FOREIGN PATENT DOCUMENTS

| | | |
|---|---|---|
| EP | 2 865 645 A1 | 4/2015 |
| JP | 2016-172823 A | 9/2016 |
| JP | 2016172823 A | 9/2016 |

OTHER PUBLICATIONS

"TEMPO-oxidized cellulose nanofibers", Isogai et al., Nanoscale, 2011, 3, 71-85; 15 pages.*
"Inkjet Printing as a Key Enabling Technology for Printed Electronics", Sridhar et al., Material Matters, vol. 6, Article 1, no date available; https://www.sigmaaldrich.com/technical-documents/articles/material-matters/inkjet-printing-as.html; 6 pages.*
Avendano et al., "Multiwalled Carbon Nanotube/Cellulose Composite: From Aqueous Dispersions to Pickering Emulsions," American Chemical Society Publications, Langmuir, Apr. 6, 2016, 32, pp. 3907-3916.
Fraschini et al., "Tempo-mediated Surface Oxidation of Cellulose Nanocrystals (CNCs)," Cellulose (2017), 24, pp. 2775-2790.
Koga et al., "Transparent, Conductive, and Printable Composites Consisting of TEMPO-Oxidized Nanocellulose and Carbon Nanotube," American Chemical Society Publications, BioMacromolecules, 2013, 14, pp. 1160-1165.
Extended European Search Report dated Aug. 14, 2019 in corresponding EP Application No. 19171472.4, 7 pages.
Office Action dated May 5, 2020 in corresponding Canadian Application No. 3,040,722 (4 pages).

* cited by examiner

*Primary Examiner* — Helene Klemanski
(74) *Attorney, Agent, or Firm* — MH2 Technology Law Group LLP

(57) ABSTRACT

Aqueous ink compositions and methods for fabricating a resistive material for a printed circuit are provided. The aqueous ink composition may include an aqueous solvent, one or more carbon nanoparticles, and one or more cellulose nanocrystals. The one or more carbon nanoparticles may include carbon nanotubes, such as multi-walled nanotubes, and the one or more cellulose nanocrystals may include cellulose nanocrystals functionalized with carboxylate groups.

17 Claims, 2 Drawing Sheets

AQUEOUS CARBON NANOPARTICLE INK COMPOSITION FOR RESISTORS

TECHNICAL FIELD

The presently disclosed embodiments or implementations are directed to resistive materials for printed electronics.

BACKGROUND

Conventional resistors may be or include materials or devices having designated resistances that provide a resistance to the passage of an electric current. For example, resistors or resistive materials thereof may often be disposed or deposited on a printed circuit to provide resistance to the electric current in a portion of the printed circuit. To change the resistance of a conventional resistor, the dimensions of the resistor or the material utilized in the resistor may be adjusted or modified. In many applications, such as in printed electronics, adjusting the size of a resistor is undesirable. Further, utilizing a number of resistive materials having varying resistances to provide a broad range of resistances is cost prohibitive; and thus, similarly undesirable.

In view of the foregoing, resistors may often be fabricated from resistive polymer-based solutions or inks that may be diluted to tune the resistance thereof. For example, conventional resistors may often be fabricated from dilutable polymer-based solutions incorporating conductive materials, such as multiwalled carbon nanotubes (MWCNTs). While dispersing the conductive materials into organic or polymer-based solutions have demonstrated efficacy, incorporating the conductive materials (e.g., MWCNTs) in an aqueous media or solution that may be utilized in printed electronics or jetting applications (e.g., aerosol jet, ink jet printing, etc.) has proven to be challenging. For example, MWCNTs are not readily dispersed in aqueous media, and functionalizing the MWCNTs to facilitate the dispersion negatively impacts the electrical performance or efficacy of the resulting resistor.

What is needed, then, are improved resistive materials and methods for preparing and utilizing the resistive materials in printed electronics.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

The present disclosure may provide an aqueous ink composition including an aqueous solvent, one or more carbon nanoparticles, and one or more cellulose nanocrystals. The aqueous ink composition may have a viscosity at 25° C. of from about 1 cP to about 15 cP.

In some examples, the one or more carbon nanoparticles may include carbon nanotubes.

In some examples, the one or more carbon nanoparticles may include one or more of single-walled nanotubes, double-walled nanotubes, and multi-walled nanotubes.

In at least one example, the one or more nanoparticles includes multi-walled nanotubes. The multi-walled nanotubes may include bare multi-walled nanotubes. The multi-walled nanotubes may also include functionalized multi-walled nanotubes.

In at least one example, the one or more cellulose nanocrystals may include functionalized cellulose nanocrystals. The functionalized cellulose nanocrystals may include a plurality of carboxylate groups disposed on respective surfaces thereof. The functionalized cellulose nanocrystals may have a total acid content of from about 100 mmol/kg to about 1600 mmol/kg.

The present disclosure may also provide an aqueous ink composition including an aqueous solvent, one or more carbon nanoparticles, and one or more cellulose nanocrystals. The one or more carbon nanoparticles may include multi-walled nanotubes, and the one or more cellulose nanocrystals may include carboxylated cellulose nanocrystals having a total acid content of from about 100 mmol/kg to about 1600 mmol/kg.

In some examples, the multi-walled nanotube may be bare multi-walled nanotubes.

In some examples, the aqueous ink composition may have a viscosity at 25° C. of from about 1 cP to about 15 cP. In other examples, the aqueous ink composition may have a viscosity at 25° C. of from about 1.22 cP to about 1.36 cP.

In some examples, the aqueous ink composition may only include the aqueous solvent, the one or more carbon nanoparticles, and the one or more cellulose nanocrystals.

The present disclosure may further provide a method for preparing an aqueous ink composition. The method may include contacting the cellulose nanocrystals with the aqueous solvent to prepare a cellulose nanocrystal solution. The method may also include contacting the carbon nanoparticles with the cellulose nanocrystal solution to disperse the carbon nanoparticles in the cellulose nanocrystal solution.

In some examples, the method may also include functionalizing the cellulose nanocrystals with carboxylate groups.

In some examples, the aqueous solvent includes water and the carbon nanoparticles includes base multi-walled carbon nanotubes.

In some examples, the method may include at least partially stabilizing the bare multi-walled carbon nanotubes with the cellulose nanocrystals.

The present disclosure may also provide a method for fabricating a resistive material for a printed circuit. The method may include depositing any aqueous ink composition disclosed herein on to a substrate. The method may also include at least partially drying the aqueous ink composition.

In some examples, at least partially drying the aqueous ink composition may include heating the aqueous ink composition.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which.

DETAILED DESCRIPTION

Figure 1:
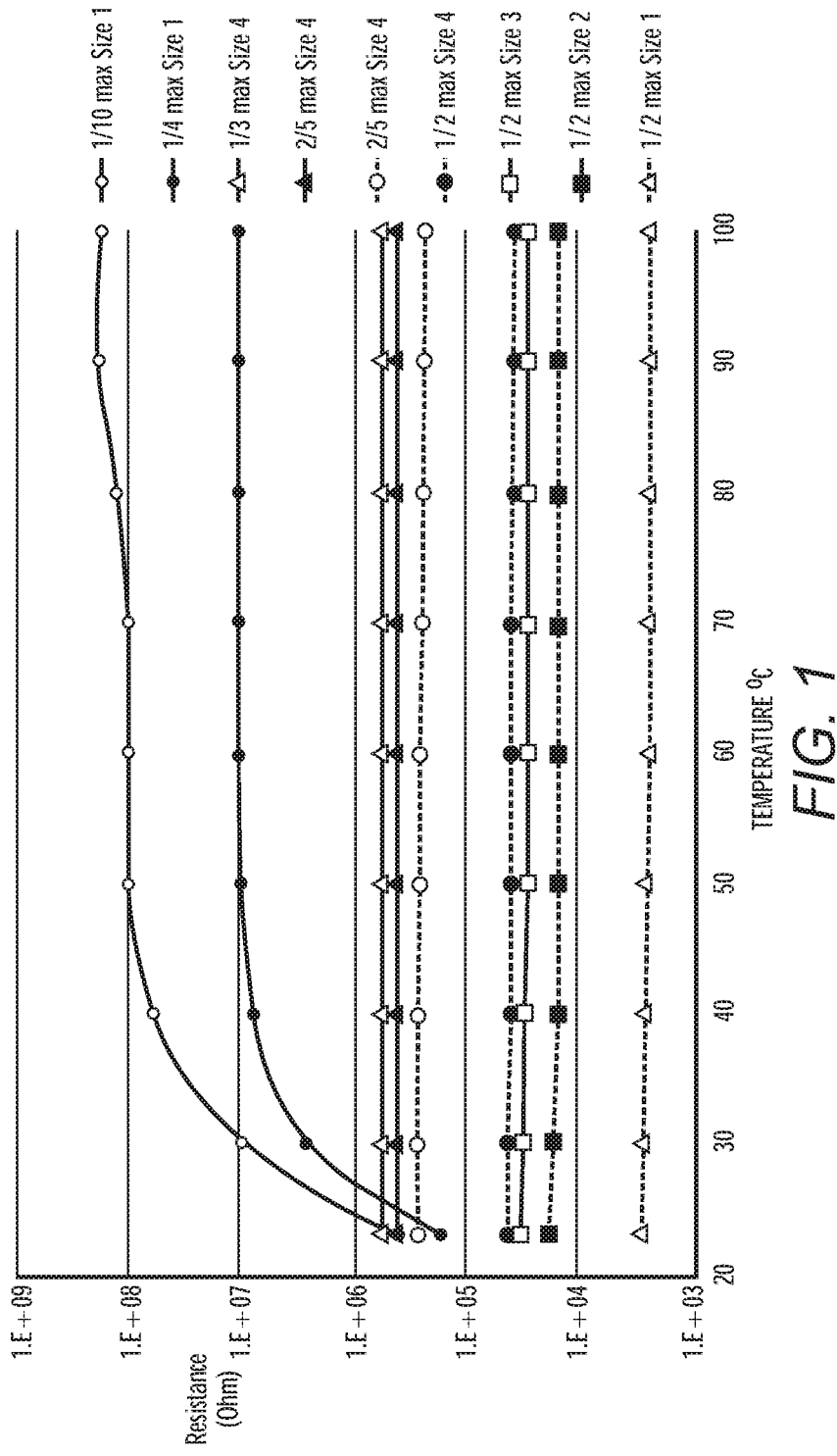
FIG. 1 illustrates a plot of the electrical resistance with respect to temperature at varying concentrations of the CNC(COOH)/MWCNT mixture and various resistor sizes.

The following description of various typical aspect(s) is merely exemplary in nature and is in no way intended to limit the disclosure, its application, or uses.

As used throughout, ranges are used as shorthand for describing each and every value that is within the range. Any value within the range may be selected as the terminus of the range. In addition, all references cited herein are hereby incorporated by reference in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/BB/C, AB/C, etc. In addition, throughout the specification, the meaning of "a," "an," and "the" include plural references. The meaning of "in" includes "in" and "on."

Reference will now be made in detail to exemplary embodiments of the present teachings, examples of which are illustrated in the accompanying drawings. Wherever possible, the same reference numbers will be used throughout the drawings to refer to the same, similar, or like parts.

Compositions

Embodiments disclosed herein may be or include an ink composition, such as a resistive ink composition. For example, the ink composition disclosed herein may be an inkjet printable ink composition suitable for fabricating a resistor for printable electronics and/or on plastic substrates. The ink composition may be aqueous or an aqueous-based composition. For example, the ink composition may be an aqueous ink composition including one or more carbon nanoparticles and one or more cellulose nanocrystals suspended, dissolved, mixed, or otherwise dispersed in a solvent, such as an aqueous solvent.

A viscosity of the aqueous ink composition including the carbon nanoparticles and the cellulose nanocrystals dispersed in the solvent may vary widely. In at least one embodiment, the aqueous ink composition may have a viscosity of from about 1 cP to about 15 cP at 25° C. In at least one embodiment, the viscosity of the aqueous ink composition may be from about 0.25 cP to about 3 cP, about 0.5 cP to about 2.5 cP, about 1 cP to about 2 cP, from about 1 cP to about 1.5 cP, or from about 1.22 cP to about 1.36 cP.

Compositions disclosed herein may also be or include materials or compositions made or fabricated from the aqueous ink composition including the one or more carbon nanoparticles and the one or more cellulose nanocrystals suspended, dissolved, mixed, or otherwise dispersed in the solvent. For example, compositions disclosed herein may be or include a resistor, such as a printed resistor or coatings for printed electronics, fabricated from the aqueous ink composition (e.g., via inkjet printing).

The material or composition (e.g., resistor, printed resistor, etc.) fabricated from the aqueous ink composition may have a temperature coefficient of resistance (TCR) of from about 1100 ppm/° C. to about 2800 ppm/° C. For example, the material or composition fabricated from the aqueous ink composition may have a TCR of from about 1100 ppm/° C. to about 2800 ppm/° C., from about 1300 ppm/° C. to about 2700 ppm/° C., or from about 1350 ppm/° C. to about 2640 ppm/° C., at temperatures less than or equal to about 100° C.

Carbon Nanoparticles

In at least one embodiment, the ink composition may include one or more carbon nanoparticles and/or composites thereof. The carbon nanoparticles may include molecular structures having one or more arrays of carbon atoms coupled with one another. For example, the carbon nanoparticles may include, but are not limited to, nano-scale molecular structures (e.g., having at least one dimension less than 100 nanometers) having pentagonal, hexagonal, and/or heptagonal arrays of carbon atoms coupled with one another. Illustrative carbon nanomaterials may include, but are not limited to, fullerenes, graphene, carbon nanotubes, and the like, and mixtures or combinations thereof. Illustrative fullerenes may include, but are not limited to, C60, C70, C76, C84, and the like.

As used herein, the term or expression "carbon nanotubes" (CNT) may refer to carbon-based molecules having a generally elongated, hollow, tubular structure. The hollow, tubular structure of the carbon nanotubes may be formed from two-dimensional sheets of hexagonally arrayed carbon atoms, such as graphene. The CNTs may be or include straight and/or bent sidewalls, and respective ends of each of the CNTs may be opened and/or closed. The carbon nanotubes may be single-walled nanotubes (SWCNTs), double-walled nanotubes, and/or multi-walled nanotubes (MW-CNTs). The carbon nanotubes may be purified carbon nanotubes and/or crude carbon nanotubes (e.g., as synthesized). The carbon nanotubes may be or include bare or pristine carbon nanotubes and/or functionalized carbon nanotubes. As used herein, the expressions "bare carbon nanotubes," "pristine carbon nanotubes," or "non-functionalized nanotubes," may refer to carbon nanotubes that have not undergone any separate surface modifications and/or treatments subsequent to synthesis and/or purification thereof. As used herein, the expression "functionalized carbon nanotubes" may refer to carbon nanotubes that may have undergone a surface modification and/or treatment such that one or more functional chemical moiety or moieties are associated therewith. For example, functionalized carbon nanotubes may include carbon nanotubes that have undergone a surface modification treatment such that one or more functional chemical moiety or moieties may be associated with the sidewalls (i.e., inner and/or outer sidewalls)

and/or the ends of the hollow, tubular structure. In at least one embodiment, the carbon nanoparticles may include pristine or non-functionalized MWCNTs. For example, the ink composition may include MWCNTs as provided by a supplier. It should be appreciated that functionalized MWCNTs have one or more electrical properties that are divergent or different from non-functionalized MWCNTs.

The amount of concentration of the carbon nanoparticles present in the ink composition may vary widely. In at least one embodiment, the amount of the carbon nanoparticles present in the ink composition may be greater than or equal to 10% of a maximum stable loading of the carbon nanoparticles. For example, the amount of the carbon nanoparticles present in the ink composition may be from about 0.01 weight % to about 5 weight %, about 0.25 weight % to about 1.0 weight %, about 0.1 weight % to about 1 weight %, about 1 weight % to about 2 weight %, or about 2 weight % to about 5 weight % of a maximum stable loading or of the total weight of the aqueous ink composition. It should be appreciated that the maximum stable loading may be determined by mixing, combining, dispersing, or otherwise contacting the carbon nanoparticles with the aqueous solvent, and subsequently centrifuging the mixture to remove aggregates and leaving the dispersed carbon nanoparticles in the aqueous solvent. Alternatively, serial mixtures of aqueous solutions containing varying amounts of carbon nanoparticles may be centrifuged, and the maximum stable loading may be determined by the mixture containing no aggregates. Alternative methods of determining the maximum stable loading may involve utilizing UV-visible spectroscopy and are known in the art.

Cellulose Nanocrystals

In at least one embodiment, the aqueous ink composition may include cellulose nanocrystals (CNCs) configured to at least partially facilitate the stabilization, mixing, or dispersion of the carbon nanoparticles in the aqueous solvent. For example, the cellulose nanocrystals may physically and/or chemically stabilize the carbon nanoparticles in the aqueous solvent via physical and/or chemical interactions. Illustrative physical and/or chemical interactions that may be present in the aqueous ink composition may be or include covalent bonding, hydrogen bonding, coordination complex bonding, ionic bonding, van der Waals' forces, dipole-dipole interactions, and the like, or combinations thereof. The physical and/or chemical interactions may be present between the CNCs and the carbon nanoparticles, the CNCs and the solvent (e.g., water or cosolvent), or the carbon nanoparticles and the solvent. As used herein, the term "cellulose nanocrystals" (CNCs) may refer to rigid, elongated rod-like crystalline cellulose nanoparticles. The CNCs may be extracted from natural cellulosic materials or sources (e.g., wood pulp, cotton, bacteria, tunicates, etc.) via depolymerization of amorphous cellulose with one or more acids. The CNCs may be in the form of single cellulose crystallites. The CNCs may also be in the form of a bundle or group of cellulose crystallites.

In at least one embodiment, each of the CNCs may have lengths of from about 50 nm to about 1000 nm. For example, the lengths of the CNCs may be from about 50 nm to about 1000 nm, about 200 nm to about 800 nm, or about 400 nm to about 600 nm.

In at least one embodiment, each of the CNCs may have widths of from about 5 nm to about 50 nm. For example, the width of the CNCs may be from about 5 nm to about 50 nm, about 15 nm to about 40 nm, or about 25 nm to about 35 nm.

In at least one embodiment, respective surfaces of each of the CNCs may be functionalized with one or more chemical functional groups. As used herein, the expression "functionalized cellulose nanocrystals" or "functionalized CNCs" may refer to CNCs that have undergone a modification and/or treatment such that one or more functional chemical moiety or moieties are associated therewith. For example, functionalized CNCs may be or include CNCs that have undergone a surface modification treatment such that one or more functional chemical groups may be associated with surfaces thereof. Illustrative functional chemical groups may be or include, but are not limited to, carboxyl groups, amide groups, sulfide groups, carbonyl groups, sulfate groups, and the like, and mixtures or combinations thereof. In at least one embodiment, the CNCs are functionalized with carboxylate groups, or carboxylate groups are selectively introduced to surfaces of the CNCs to provide carboxylated cellulose nanocrystals (CNC(COOH)).

The carboxylated cellulose nanocrystals (CNC(COOH)) may have a total acid content of from about 100 mmol/kg to about 1600 mmol/kg. For example, the CNCs may be functionalized with the carboxylate groups such that the resulting CNC(COOH)s have a total acid content of from about 100 mmol/kg to about 1600 mmol/kg, about 300 mmol/kg to about 1000 mmol/kg, or about 700 mmol/kg to about 900 mmol/kg.

The amount of concentration of the CNCs (e.g., CNC(COOH)s) present in the ink composition may vary widely. In at least one embodiment, the CNCs may be present in an effective amount to stabilize a sufficient amount of the carbon nanoparticles present in the aqueous ink composition. For example, the CNCs may be present in an effective amount to sufficiently stabilize at least about 80%, at least about 90%, at least about 95%, at least about 98%, or about 100% of the carbon nanoparticles present in the aqueous ink composition, the ink composition, or the fabricated resistor.

In at least one embodiment, the amount of the CNCs present in the aqueous ink composition may be from about 0.01 weight % to about 5 weight %, based on a total weight of the ink composition. For example, the amount of the CNCs present in the ink composition may be from about 0.01 weight % to about 5 weight %, about 0.1 weight % to about 4 weight %, about 1 weight % to about 3 weight %, about 1.5 weight % to about 2.5 weight %, or about 2 weight % to about 2.5 weight %.

Solvent

In at least one embodiment, the solvent of the aqueous ink composition may be an aqueous solvent, such as water, deionized water, demineralized water, and/or softened water. Water may make up the balance of the aqueous ink composition. In another embodiment, the solvent may be a co-solvent. As used herein, the term "co-solvent" may refer to a mixture of water and a water soluble or water miscible organic component. Illustrative water soluble or water miscible organic components may be or include, but are not limited to, alcohol, alcohol derivatives, amides, ethers, urea, substituted urea (e.g., thiourea, ethylene urea, alkylurea, etc.), carboxylic acids and their salts, esters, organosulfides, organosulfoxides, sulfones, and the like, and mixtures or combinations thereof. Illustrative alcohol and alcohol derivatives may be or include, but are not limited to, aliphatic alcohols, aromatic alcohols, dials, glycol ethers, polyglycol ethers, long chain alcohols, primary aliphatic alcohols, secondary aliphatic alcohols, ethanol, methanol, propanol, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like, and mixtures or combinations thereof Additional Components/Ingredients In at least one embodiment, the ink composition may include one or more additional components/ingredients. The additional components/ingredients may not aid or facilitate the stabilization of the carbon nanoparticles in the ink composition. The additional components/ingredients may be configured to facilitate the printability of the ink composition. Illustrative additional components may be or include, but are not limited to, N-methyl-2-pyrrolidone (NMP), surfactants, and mixtures thereof. Illustrative surfactants may be or include, but are not limited to, anionic surfactants, nonionic surfactants, cationic surfactants, amphoteric surfactants, and mixtures or combinations thereof. In at least one example, the aqueous ink composition includes nonionic surfactant polyethylene glycol p-(1,1,3,3-tetramethylbutyl)-phenyl ether ($C_{14}H_{22}O(C_2H_4O)_n$) (CAS No. 9002-93-1) or TRITON X, which is commercially available from Sigma-Aldrich of St Louis, Mo.

Methods

Embodiments of the present disclosure may provide methods for producing an aqueous ink composition including one or more carbon nanoparticles suspended, dissolved, mixed, or otherwise dispersed in a solvent. The method may include combining, mixing, agitating, complexing, or otherwise contacting, the carbon nanoparticles (e.g., non-functionalized MWCNTs) with functionalized CNCs in a suitable solvent. For example, the method may include contacting non-functionalized MWCNTs with functionalized CNCs in water. In another example, the method may include contacting the non-functionalized MWCNTs, the functionalized CNCs, and water with one another. The method may also include functionalizing the CNCs with carboxylate groups. The method may also include at least partially stabilizing or fully stabilizing the carbon nanoparticles in an aqueous solvent with the functionalized CNCs.

Embodiments of the present disclosure may also provide methods for fabricating a resistive material, component, or element. For example, the present disclosure may provide methods for fabricating a resistor on a printed circuit board. As used herein, the term or expression "printed circuit board" may represent a generic term or expression for completely processed "printed wiring" where predetermined conductive patterns may be used to interconnect electronic components on a common insulating substrate. Illustrative printed circuit boards may be or include, but are not limited to, single-sided, double-sided, and multilayer boards that may be made with rigid, flexible, and/or rigid-flex materials.

The methods for fabricating the resistive material may include disposing or depositing the aqueous ink composition onto a substrate or electrodes thereof, and at least partially drying the aqueous ink composition or at least partially evaporating the aqueous solvent from the aqueous ink composition. The aqueous ink composition may be deposited onto the substrate or electrodes thereof according to a predetermined or desired circuit design. The aqueous ink composition may be deposited onto a connective pad (e.g., solution depositing, jetting, etc.). As used herein, the term "solution depositing" or "solution deposition" may refer to a process whereby a liquid is deposited or contacted with a substrate. Solution deposition may be utilized to form a coating or pattern. Illustrative solution deposition techniques may include, but are not limited to, spin coating, dip coating, spray coating, slot die coating, flexographic printing, offset printing, screen printing, gravure printing, ink jet printing, and the like.

In at least one embodiment, the methods disclosed herein may include ink jet printing the aqueous ink composition onto a substrate or other surface. The methods disclosed herein may also include aerosol jet printing the aqueous ink composition onto the substrate. As used herein, "aerosol jet printing" may refer to a process or technique of atomizing a liquid (e.g., the aqueous ink composition) to produce droplets of the liquid on a micron scale. The atomized droplets of aerosol jet printing may be entrained in a gaseous stream and delivered to a print head where an annular flow of gas may be introduced around the aerosol stream to focus the droplets into a collimated beam or path. The combined gas streams may be propelled by the print head through a converging nozzle that may compress the aerosol stream into a relatively smaller diameter (e.g., 1-10 μm). The jet may be propelled out of the print head and deposited onto the substrate.

The substrates may be any suitable substrate or substrate compatible with the aqueous ink composition. Illustrative substrates may be or include, but are not limited to, silicon, a glass plate, plastic or polymeric materials (e.g., a plastic film), sheet, fabric, synthetic paper, and the like. Illustrative polymeric materials may be or include, but are not limited to, polyester, polycarbonate, polyimide sheets, polyethylene terephthalate (PET) sheets, polyethylene naphthalate (PEN) sheets, and the like.

In at least one embodiment, the aqueous ink composition may be at least partially dried or the aqueous solvent may be at least partially evaporated without curing or heating. For example, the aqueous ink composition may be air dried. In another embodiment, the aqueous ink composition may be at least partially dried or the aqueous solvent may be at least partially evaporated via curing or heating at relatively high temperatures (e.g., above room temperature). As used herein, the term "heating" may refer to any technique that may impart sufficient energy to at least partially evaporate the solvent of the aqueous ink composition or at least partially dry the aqueous ink composition. Illustrative heating techniques may be or include, but are not limited to, thermal heating (e.g., hot plate, oven, burner, etc.), infrared (IR) radiation, laser beam, flashlight, microwave radiation, ultraviolet (UV) radiation, and the like, and combinations thereof. In another embodiment, the method for fabricating the resistive material may not include any curing or heating. For example, the aqueous solvent may be at least partially evaporated at room temperature. Accordingly, it should be appreciated that the aqueous ink compositions disclosed herein may be used with a variety of substrates, including low melting point polymeric substrates.

The method may also include at least partially increasing or decreasing the resistance of the resistive material fabricated form the aqueous ink composition. The method may include increasing or decreasing the amount or concentration of the carbon nanoparticles present in the aqueous ink composition. For example, the method may include at least partially diluting the aqueous ink composition or adding additional carbon nanoparticles to modulate or control the resistance of the resistive material.

EXAMPLES

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

Example 1

An aqueous carboxylated cellulose nanocrystal (CNC (COOH)) solution was prepared. Approximately 2 g of cellulose nanocrystals (CNCs) having about 12.17 mmol primary alcohol groups were added to about 100 g of deionized (DI) water. The aqueous mixture was then probe sonicated at 350 W and 100% amplitude for about 1 min at full power under stirring with a magnetic stir bar maintained at about 500 rpm. Sodium bromide (about 6.17 mmol) and 2,2,6,6-tetramethylpiperidine-1-oxyl (TEMPO) (about 6.17 mmol) were then added to the sonicated aqueous mixture. Sodium hypochlorite (NaClO) in an amount of about 13.7 g (4% solution in water adjusted to a pH of about 10 with hydrochloric acid) was then incrementally added at about 1 mL/min and stirred for about 2 hours while incrementally adding about 0.2 M NaOH to maintain a pH of about 10. After stirring for about 2 hours, about 4 mL of methanol was added to react with any excess NaClO to thereby quench the reaction and prepare the CNC(COOH) solution.

Example 2

The aqueous CNC(COOH) solution from Example 1 was purified. To purify, the prepared aqueous CNC(COOH) solution of Example 1 was centrifuged at about 2,700 g for about 20 min. After centrifugation, the supernatant, a pale yellow clear liquid, was removed and a generally white gel at the bottom of the centrifuge tube was collected. Then, about 20 mL of DI water was added to the white gel and agitated for about 20 minutes, and the mixture was centrifuged for about 20 min at about 20,000 g. The resulting supernatant from the centrifugation, a clear colorless liquid, was then removed and the white gel at the bottom of the centrifuge tube was retained. About 20 mL of DI water was then added to the white gel and agitated for about 20 minutes, followed by centrifugation at about 20,000 g for about 60 min. Following centrifugation, the clear colorless supernatant was removed and the white gel at the bottom of the centrifuge tube was collected. Approximately 10.62 g of the white gel was collected, and about 91.38 g of DI water was added, resulting in an about 2 wt % solution, which was then probe sonicated at 350 W and 100% amplitude for about 2 min at full power to form the purified aqueous CNC(COOH) solution, which generally appeared as a dispersed milky white solution.

Example 3

Multiwalled carbon nanotubes (MWCNTs) were suspended or otherwise dispersed in the purified aqueous CNC (COOH) solution prepared in Example 2. To suspend or disperse the MWCNTs, about 0.1 g of MWCNTs were added to about 10 g of the about 2 wt % CNC(COOH) solution and probe sonicated at 350 W and 100% amplitude for about 20 min under cooling. The resulting solution was a dark black suspension, which was centrifuged at about 20,000 g for about 60 min. The resulting supernatant or saturated solution of the MWCNTs in the purified aqueous CNC(COOH) was collected and the pellet was discarded. The saturated solution of the MWCNTs was then utilized to prepare samples having varying concentrations of MWCNTs. Particularly, the saturated solution was diluted by adding varying amounts of an about 2 wt % CNC(COOH) solution to prepare samples having varying amounts or concentrations of MWCNTs. It should be appreciated that similar procedures were performed to prepare more dilute CNC(COOH) solutions; for example, CNC(COOH) solutions from about 0.1 wt % to about 2 wt %.

Example 4

Polycarbonate substrates patterned with interdigitated silver (Ag) electrodes were prepared with varying lengths between the electrodes, and respective CNC(COOH) solutions including varying amounts of MWCNTs (prepared in Example 3) were disposed or deposited onto each of the respective Ag electrodes. The size or dimensions of each of the sample electrodes is summarized in Table 1. Particularly, the varying lengths between the electrodes, and the widths of the electrodes are summarized in Table 1. After deposition, the CNC(COOH) solutions including the MWCNTs were then dried at about 60° C. or about 22° C. for about 20 min to about 120 min.

TABLE 1

| Sample | Length between electrodes (μm) | Width of electrodes (μm) |
| --- | --- | --- |
| 1 | 130 | 1000 |
| 2 | 455 | 1000 |
| 3 | 780 | 1000 |
| 4 | 2000 | 1000 |

The resistance between each of the electrodes was measured while the voltage was held at about 2V and the temperature was varied from about 20° C. to about 100° C. The electrical resistance with respect to temperature of various concentrations of the CNC(COOH)/MWCNT mixture and various resistor sizes is illustrated in FIG. 1. The plot in FIG. 1 provides a range of operation for the resistor (Ohm range), which may be determined by the length of the channel and the loading of the carbon nanoparticles (i.e., MWCNTs). It should be appreciated that TCR is independent of the size of the device, as similar values for the 50 weight % max loading values were observed. The TCR values for the various samples having various resistor sizes and MWCNT concentrations is summarized in Table 2.

TABLE 2

TCR Values for Various Resistor Sizes and MWCNT Concentrations

| Sample | % MWCNT of max loading | TCR (ppm/° C.) |
| --- | --- | --- |
| 1 | 50 | 1875 |
| 1 | 40 | 2642 |
| 1 | 25 | −40641 |
| 1 | 10 | −249446 |
| 2 | 50 | 1518 |
| 3 | 50 | 1755 |
| 4 | 50 | 1499 |
| 4 | 40 | 1336 |
| 4 | 33 | 1358 |

As illustrated in Table 2, the temperature coefficient of resistance (TCR) observed was from about 1350 to about 2640 ppm/° C. It should be appreciated that the change in resistance observed was relatively small up to at least about 100° C. The average TCR was about 1710 ppm/° C. As further illustrated in Table 2, a change in electrical performance was observed when the MWCNTs were provided in amounts or concentrations of about 25% or less of its maximum loading. Without being bound by theory, it is believed that at about 25% or less of the maximum MWCNT loadings, each of the samples approaches, but stays below, its percolation threshold and the majority of the electrical signal is attributed to the CNC binder. This is best illustrated in the testing of Sample 1 where the MWCNTs were provided in amounts of about 10% and about 25% MWCNT of the maximum loading.

Example 5

Rheology or rheological data of an about 2 wt % CNC (COOH) mixture or ink including MWCNTs was evaluated. The rheology was evaluated using an Ares G2 controlled-strain rheometer having an about 25 mm parallel plate geometry, set at about 0.5 mm gap and about 25° C. such that the applied shear rate sweep ranged from about 1 s$^{-1}$ to about 400 s$^{-1}$. A flow sweep test procedure was run at about 25° C., at a shear rate of about 40 to about 400 l/sec. The rheological data is summarized in Table 3 and FIG. 2.

TABLE 3

Rheology Data for 2 wt % CNC(COOH) ink

| | Shear Rate Range (s$^{-1}$) | | | |
|---|---|---|---|---|
| | 4-400 | 10-400 | 40-400 | 1-6.3 |
| Shear Index | 0.79 | 0.87 | 0.85 | 1.07 |
| Mean viscosity | 1.33 | 1.34 | 1.36 | 1.22 |

Figure 2:
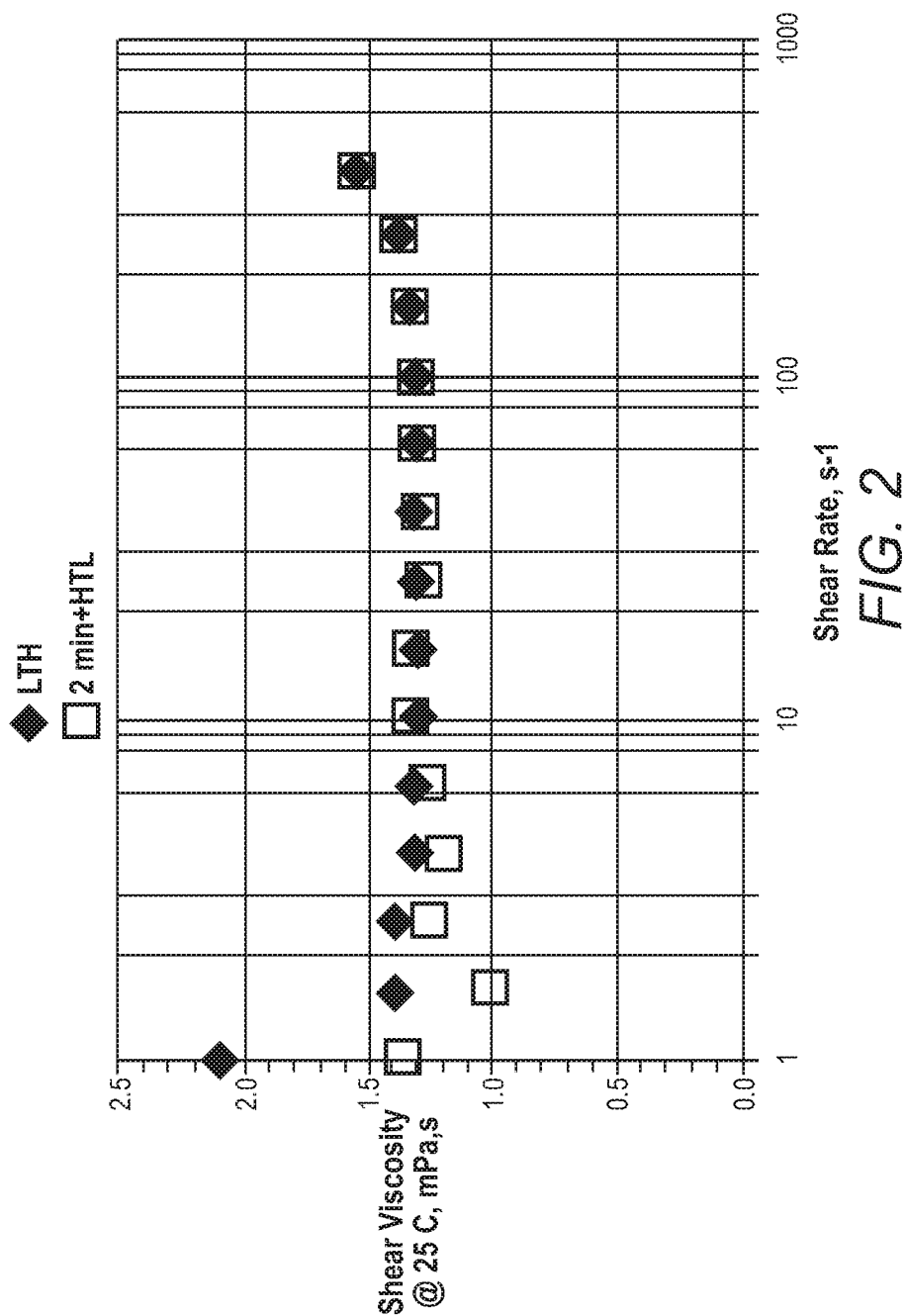
FIG. 2 illustrates a plot of the shear viscosity of a 2 wt % CNC(COOH) mixture including MWCNTs at 25° C.

As illustrated in Table 3 and FIG. 2, the rheology data demonstrated a viscosity from about 1 cP to about 2 cP. It should be appreciated that the viscosity observed is within the acceptable range for inkjet printing (i.e., about 1 cP to about 15 cP).

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. An aqueous ink composition comprising an aqueous solvent, one or more carbon nanoparticles, and one or more cellulose nanocrystals, wherein the one or more carbon nanoparticles comprise non-functionalized multi-walled nanotubes, wherein the aqueous ink composition has a viscosity at 25° C. of from about 1 cP to about 15 cP, wherein the one or more cellulose nanocrystals comprise primary alcohol groups, and wherein the primary alcohol groups of the cellulose nanocrystals are oxidized to respective carboxylate groups.

2. The aqueous ink composition of claim 1, wherein the one or more carbon nanoparticles further comprises carbon nanotubes.

3. The aqueous ink composition of claim 1, wherein the one or more carbon nanoparticles further comprises one or more of single-walled nanotubes and double-walled nanotubes.

4. The aqueous ink composition of claim 1, wherein the one or more carbon nanoparticles further comprises functionalized multi-walled nanotubes.

5. The aqueous ink composition of claim 1, wherein the cellulose nanocrystals have a total acid content of from about 100 mmol/kg to about 1600 mmol/kg.

6. The aqueous ink composition of claim 1, wherein the primary alcohols of the cellulose nanocrystals are oxidized to the respective carboxylate groups via oxidation with 2,2,6,6-tetramethylpiperidine-1-oxyl (TEMPO).

7. The aqueous ink composition of claim 6, wherein the primary alcohols of the cellulose nanocrystals are oxidized to the respective carboxylate groups via oxidation with TEMPO at a pH of about 10.

8. An aqueous ink composition comprising an aqueous solvent, one or more carbon nanoparticles, and one or more cellulose nanocrystals, wherein the aqueous solvent comprises water, wherein the one or more carbon nanoparticles comprises non-functionalized multi-walled nanotubes, and wherein the one or more cellulose nanocrystals comprises primary alcohol groups, and wherein the primary alcohol groups are oxidized to respective carboxylate groups, and wherein the one or more cellulose nanocrystals comprise a total acid content of from about 100 mmol/kg to about 1600 mmol/kg.

9. The aqueous ink composition of claim 8, wherein the aqueous ink composition has a viscosity at 25° C. of from about 1 cP to about 15 cP.

10. The aqueous ink composition of claim 8, wherein the aqueous ink composition has a viscosity at 25° C. of from about 1.22 cP to about 1.36 cP.

11. The aqueous ink composition of claim 8, wherein the aqueous ink composition consists essentially of the aqueous solvent, the one or more carbon nanoparticles, and the one or more cellulose nanocrystals.

12. The aqueous ink composition of claim 8, wherein the aqueous ink composition consists of the aqueous solvent, the one or more carbon nanoparticles, and the one or more cellulose nanocrystals.

13. A method for preparing the aqueous ink composition of claim 1, comprising:
contacting the cellulose nanocrystals with the aqueous solvent to prepare a cellulose nanocrystal solution;
functionalizing the cellulose nanocrystals with the carboxylate groups via oxidation with 2,2,6,6-tetramethylpiperidine-1-oxyl (TEMPO); and
contacting the one or more carbon nanoparticles with the cellulose nanocrystal solution to disperse the one or more carbon nanoparticles in the cellulose nanocrystal solution.

14. The method of claim 13, further comprising at least partially stabilizing the non-functionalized multi-walled carbon nanotubes with the cellulose nanocrystals.

15. A method for fabricating a resistive material for a printed circuit, comprising:
depositing the aqueous ink composition of claim 1 onto a substrate; and
at least partially drying the aqueous ink composition.

16. The method of claim 15, wherein at least partially drying the aqueous ink composition comprises heating the aqueous ink composition.

17. An aqueous ink composition comprising an aqueous solvent, non-functionalized multi-walled nanotubes, and one or more cellulose nanocrystals, wherein the aqueous ink composition has a viscosity at 25° C. of from about 1.22 cP to about 1.36 cP, wherein the multi-walled nanotubes are present in an amount greater than or equal to 33% of a maximum stable loading of the multi-walled nanotubes, wherein the one or more cellulose nanocrystals are carboxylated cellulose nanocrystals (CNC(COOH)) configured to facilitate the stabilization of the multi-walled nanotubes in the aqueous solvent, and wherein the carboxylated cellulose nanocrystals are present in an effective amount to stabilize the multi-walled nanotubes in the aqueous solvent.

* * * * *